United States Patent Office 3,409,637
Patented Nov. 5, 1968

3,409,637
SULFONATING OLEFINS WITH GASEOUS SULFUR TRIOXIDE AND COMPOSITIONS OBTAINED THEREBY
Raymond D. Eccles, James E. Yates, and Ted P. Matson, Ponca City, Okla., assignors to Continental Oil Company, Ponca City, Okla., a corporation of Delaware
No Drawing. Filed July 22, 1963, Ser. No. 296,458
7 Claims. (Cl. 260—327)

This invention relates to the sulfonation of olefins. More particularly, the invention concerns a process involving the reaction between gaseous sulfur trioxide and a higher straight-chain olefin, whereby valuable alkyl sultones and/or surface active aliphatic sulfonates can be readily prepared. In narrower aspects, the present invention relates to a novel, biodegradable surface active composition composed principally of a mixture of n-alkene and gamma hydroxy n-alkyl sulfonate and to light-duty and liquid heavy-duty detergent formulations containing said surface active composition.

During the past decade or so, a considerable amount of investigation has been directed toward processes for converting olefins into sulfonic acid derivatives exhibiting surface active properties. Only two principal modes for sulfonating olefins have evolved from these investigations. One of these methods is based upon the mechanism whereby a bisulfite ion adds to the olefinic double bond in the presence of a reaction-initiating oxidant to yield an alkyl sulfonate. While the particular type of sulfonate resulting from this reaction exhibits excellent surfactant characteristics, the method suffers because it is rather difficult to carry out; and even under the most favorable conditions rather low yields of product are obtained. The other principal method for converting an olefin into a sulfonic acid derivative consists of reacting the olefin with a sulfur trioxide-organo compound complex. For example, prevalent use has heretofore been made of such materials as dioxane, pyridine, bis(beta-chloroethyl)ether, among other compounds, to form complexes with sulfur trioxide useful as agents for sulfonating olefins in this manner. This latter method represents a very effective process; however, it is a comparatively expensive operation. Another prominent disadvantage of the sulfonation method involving the use of sulfur trioxide complexes is that the surface active salts derived from the resultant sulfonation product invariably contains a substantial amount of a beta-hydroxy sulfonate exhibiting noticeably deficient water-solubility characteristics. The primary reason for employing the complexes as described appears to be based on the preconceived notion that it was mandatory in a reaction system of this type to moderate or reduce substantially the activity of the sulfur trioxide which is known to be an extremely powerful sulfonating agent. The prior art has taught in several isolated instances the use of liquid sulfur trioxide for reaction with olefinic materials, but such use was purportedly limited to certain type olefins. Contrary to what the prior art teachings in this field might indicate, we have unexpectantly found that linear and certain pendant olefins can be efficiently and beneficially converted into desirable surfactant substances through the direct use of sulfur trioxide as the sulfonating agent.

An object of this invention is to provide an improved process for converting either straight-chain or essentially linear mono-olefins into surface active materials wherein the olefin is reacted directly with gaseous sulfur trioxide.

Another object of this invention is to provide a process for preparing n-alkyl gamma-sultones.

It is also an object of this invention to provide a process for preparing biodegradable surface active compositions.

A further object of this invention is to provide a novel surface active composition exhibiting improved water-solubility and non-hygroscopic characteristics.

A still further object is to provide liquid heavy-duty detergent compositions.

These and other objects of the present invention will be better understood by those skilled in the art upon consideration of the detailed discussion and examples presented hereinbelow.

In accordance with this invention, a straight-chain or essentially linear mono-olefin is sulfonated by continuously and substantially uniformly introducing into a liquid charge of said olefin maintained at a temperature not in excess of about 50° C. a gaseous stream containing less than about ten percent by volume sulfur trioxide vapor. This broadly defines the instant process. However, it will be subsequently shown how in the implementation of this concept, one can minorly, but advantageously, affect the product distribution of the sulfonated product and additionally, how one can, if desired, segregate the products directly resulting from the sulfonation process, thereby providing a method for obtaining a certain class of sultones.

Any of the higher straight-chain mono-olefins can be employed in accordance with our process. However, since one of the principal objectives contemplated is that of making surfactant substances, the preferred olefinic starting materials contain from about 12 to 20 carbon atoms. While the applicable olefins can be either terminally or internally unsaturated, they should, as previously indicated, be straight-chain compounds or essentially so. A specific enumeration of suitable olefins is as follows: 1-n-dodecene, 1-n-tridecene, 1-n-tetradecene, 1-n-pentadecene, 1-n-hexadecene, 1-n-heptadecene, 1-n-octadecene, 1-n-nonadecene and 1-n-eicosene. Any of the internally unsaturated isomers of the above olefins can likewise be used. Especially suitable among the individual olefins are those straight-chain compounds, either terminally or internally unsaturated, containing from 15–17 carbon atoms. Also, mixtures of the various terminally unsaturated compounds, various mixtures of internally unsaturated compounds and additionally mixtures of 1-isomers and internally unsaturated compounds are applicable. Likewise, the essentially linear unsymmetrical dialkyl ethylenes having from 12 to 20 carbon atoms and mixtures thereof obtained by dimerizing linear $C_6$–$C_{10}$ mono-olefins in accordance with the process of U.S. Patent No. 2,695,327 can be used.

The straight-chain olefins described above can be readily obtained by cracking paraffin waxes. They can also be readily obtained by the recently developed process involving the reaction of a lower alkyl aluminum, e.g., triethylaluminum, with ethylene. Such a reaction yields a "growth product" essentially composed of higher trialkyl aluminum compounds wherein the alkyl groups vary in molecular weight. The growth product can be reacted with ethylene in a displacement type reaction whereby the alkyl groups present in said product are converted to alpha-olefins. The resultant olefin mixture can then be fractionated to any extent desired. Mixtures of even-numbered carbon atom alpha-olefins ranging from $C_{12}$ to $C_{20}$ obtained in accordance with the foregoing procedure which are especially useful in the practice of this invention include those further characterized in containing a substantial amount of 1-n-hexadecene and an average molecular weight corresponding to about that of said isomer.

As indicated previously, it is essential that the sulfur trioxide be introduced into the olefinic reactant in a gaseous state. In order to control the reaction, particularly from the standpoint of maintaining the proper reaction temperature, it is necessary to introduce the vaporous SO₃ diluted with a predominant amount of an inert carrier gas. Suitable gaseous sulfonating mixtures can contain from about 0.1 to 10 parts by volume sulfur trioxide and correspondingly from about 99.9 to 90 parts by volume of an inert gas. The preferred range of sulfur trioxide content is between about 1 and 4 parts on the aforesaid basis. A number of inert gaseous carriers can be utilized, such as sulfur dioxide, nitrogen, air, hydrogen, argon and the like.

During the sulfonation step, the temperature of the reaction mixture should not be permitted to rise above 50° C. Temperatures in excess of the stated figure give rise to poorly colored sulfonation products and hence are to be avoided for this reason. The reaction between the olefin and sulfur trioxide is very rapid and ordinarily a temperature substantially less than the maximum temperature given will suffice. Accordingly, it is preferred to employ a temperature within the range between 0 and 35° C. and still more preferably between about 20 and 35° C. Only in those instances where it is desired to effect a certain product distribution will the higher temperatures be used. This aspect will be explained more fully hereinbelow.

The amount of sulfur trioxide to be utilized in the practice of this invention should not significantly exceed the stoichiometric requirement for the mono-sulfonation of the olefin charge. Preferably, the amount of sulfur trioxide introduced into the olefin ranges between about 0.8 and 1.1 mol per mol of olefin being sulfonated. The gaseous sulfonating stream consisting of the sulfur trioxide and the inert carrier gas is desirably introduced continuously and at a substantially uniform rate into the liquid charge of olefin. In operating in this manner, the sulfur trioxide content of the sulfonating stream is consumed in the reaction as quickly as it is introduced into the olefin. Consequently, it is only necessary to introduce that volume of the sulfonating agent which contains a content of sulfur trioxide providing the ratio of sulfur trioxide to olefin desired to be observed for the ultimate reaction product.

In reacting sulfur trioxide with a straight-chain mono-olefin in accordance with the conditions generally outlined above, a product is obtained composed principally of two chemically distinct substances, namely, an unsaturated aliphatic sulfonic acid and an alkyl gamma-sultone. The resultant character of such products obtained in the practice of our sulfonation method was quite surprising, inasmuch as the prior art method of employing the sulfur trioxide complexes yielded a product of decidedly different composition. Another surprising result observed for the instant method of sulfonating straight-chain olefin is that one directly secures a substantial yield of a n-alkyl gamma-sultone, generally about two-thirds of the sulfonated product. Prior to the present discovery, there has been no direct method reported for preparing this type of sultone. The gamma-sultones hitherto obtainable only by tedious and expensive methods are valuable intermediates. They can, for instance, be reacted with amines, alcohols and like compounds to prepare other useful chemicals.

If the sulfonation of a straight-chain mono-olefin is carried out in accordance with this invention at temperature within the preferred range given, the reaction product will be composed of about 35 percent of the unsaturated sulfonic acid derivative and 65 percent of the gamma-sultone. Generally, the higher reaction temperatures specified coupled with the use of the higher amounts of sulfur trioxide indicated lead to somewhat lower sultone formation with a corresponding increase of the sulfonic acid derivative. The structural configurations of the alkene sulfonic acid and alkyl sultone thus secured are respectively depicted as follows:

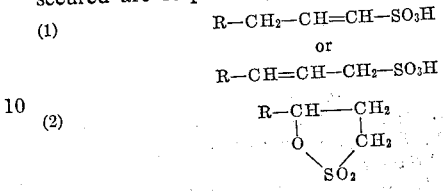

If it is desired to recover the sultone content of a sulfonation product, this can be easily accomplished by neutralizing the sulfonation product and thereupon extracting the neutralized product with a light hydrocarbon, such as pentane, hexane, heptane and the like. The sultone content of the extract can then be readily secured by distilling off the hydrocarbon. While the sultone obtained in this manner will consist essentially of the gamma isomer, it is nevertheless slightly contaminated with the delta-sultone isomer. Should it be incumbent to obtain the gamma isomer in pure form, this can easily be effected by fractionally crystallizing the extracted product.

In those instances where one wishes to convert the total sulfonation reaction product such as described above into a detergent composition, the product as such is subjected to a hydrolysis procedure. In hydrolyzing said product, the sultone content is converted to the gamma hydroxy alkyl sulfonic acid accompanied with the production of the corresponding alkene sulfonic acid. Either acid or basic hydrolysis is applicable. Should acid hydrolysis be the selected method, one need only add water to the sulfonation product and heat to an effective hydrolysis-conducive temperature, for example, at least about 70° C. The sulfonic acid content of the sulfonation product is more than ample to provide the acidity required for such hydrolysis. For the purpose of obtaining hydrolysis products exhibiting optimum color characteristics, we prefer a basic hydrolysis procedure. In observing basic hydrolysis, the sulfonation product is initially neutralized with a water-soluble base and thereupon a sufficient amount of additional base, such as caustic soda or sodium carbonate, can be continuously or periodically added to the aqueous slurry of the neutralized product to maintain the pH between about 7 and 9. Alternatively, the neutralized product can be initially adjusted to a sufficiently high pH whereby the system will not drop below a pH of about 7 during the course of hydrolysis.

As in the case of acid hydrolysis, a temperature of at least 70° C. is applicable. Hydrolysis temperatures as high as 140° C. can be satisfactorily used. As is well-known, the higher the hydrolysis temperature the quicker complete hydrolysis will be effected. The small amount of delta-sultone contaminant, the presence of which was mentioned above in connection with the outlined procedure for recovering gamma-sultone, will remain as such in the hydrolyzed product, since it is virtually impossible to hydrolyze this isomer employing the conventional hydrolysis conditions contemplated herein. Accordingly, any small amounts of the delta-sultone present can be removed by a de-oiling procedure upon neutralizing the hydrolysis reaction mixture with a water-soluble base. The de-oiled sulfonate solution can then be de-salted and dried in the usual manner.

The alkali metal and ammonium salts of the hydrolysis products described directly hereinabove possess unusually good water-solubility characteristics. In fact, we have found that the degree of water-solubility evidenced by the said salts is such whereby heavy-duty liquid detergent concentrates can be formulated therefrom. Invariably, heavy-duty detergent compositions are marketed in a dry form because their marked solubility deficiencies do not permit them to be utilized in the form of a clear liquid or aqueous concentrate.

The salient feature of a heavy-duty detergent composition resides in the presence of a substantial amount of a water-soluble polyphosphate therein which, in a detersive application, importantly serves as a hardness sequestering agent. It perhaps is worthwhile to mention at this point that when the term "water-soluble" is used, such as in connection with the applicable polyphosphates, the term is relative in meaning, for actually the polyphosphates possess rather limited solubility. This is also true of the various anionic surfactants employed in both light-duty and heavy-duty detergent compositions. Generally, in those compositions wherein no sequestering component is included, i.e., light-duty formulations, no particular difficulty is experienced in preparing clear liquid concentrates of the anionic surface-active material. This holds true even for the comparatively difficultly soluble higher alkylbenzene sulfonates, e.g., tridecylbenzene sulfonate, tetradecylbenzene sulfonate and pentadecylbenzene sulfonate. However, on combining a sequestering agent with any of the enumerated anionic surfactants, or for that matter, the more soluble dodecylbenzene sulfonate, only an extremely limited amount of the former can be used before the solid formulation becomes unsuitable for use in liquid concentrates. We have unexpectedly found that the surface-active compositions to which this invention is directed possess such outstanding water-solubility characteristics that they can be employed in combination with substantial amounts of a polyphosphate whereby liquid heavy-duty detergent concentrates can be prepared from these combinations. Moreover, the heavy-duty liquid concentrates of this invention exhibit improved detergency, especially when used in hard water, in comparison with the prior art liquid heavy-duty compositions containing an alkylbenzene sulfonate as the active.

The essential constitution of the liquid heavy-duty detergent concentrates contemplated in this invention includes from about 3–30 percent of the surface-active composition of this invention, from about 10–40 percent of a water-soluble polyphosphate and from about 40–80 percent water.

Applicable water-soluble polyphosphates are such as higher fatty acid alkanolamides, aliphatic tertiary amine oxides, etc.

While the surface-active compositions of this invention have particular usefulness in preparing liquid heavy-duty concentrates, they additionally can be used to advantage in the conventional types of light-duty detergent concentrates. The use of our surface-active compositions in light-duty concentrates provides for greater flexibility in formulation practices. Their beneficial usefulness in such compositions will be brought out more particularly in the specific examples set forth hereinbelow.

In order to illustrate further this invention, the following specific examples are given. These examples are set forth primarily for the purpose of illustration and accordingly, any enumeration of details contained therein should not be interpreted as a limitation on the invention except as indicated in the appended claims.

Example I

In this example, a plurality of sulfonation runs illustrating this invention are outlined. The sulfonation procedure observed in each run was essentially the same to the extent that the olefin to be sulfonated was charged to a suitable sulfonation vessel equipped with an agitator and cooling means, and to the charged olefin was then introduced a sulfonating gaseous stream containing about 2 percent by volume sulfur trioxide and 98 percent of an inert carrier gas. The amount of gaseous sulfonating agent introduced in the indicated manner was such as to provide the ultimate mol ratio of sulfur trioxide to olefin observed for the particular run. After introducing the requisite quantity of the gaseous sulfonating agent, the sulfonation reaction product was analyzed for sulfonate content by titration with standard cetylpyridinium bromide solution. Following this determination the sulfonation product was neutralized with caustic soda and an additional amount of caustic was added to provide an initial pH of about 13. The product was then hydrolyzed at a temperature of 80° to 90° C. until complete hydrolysis was attained. The specific operating conditions employed in each run together with data identifying the olefin used, applicable sulfur trioxide to olefin ratios employed and conversion rates are given in the following Table I:

TABLE I

| Run No. | Olefin Charged | Mol Ratio, $SO_3$:Olefin | Carrier Gas Used | Carrier Flow Rate, liters/min. | Temperature, °C. | $SO_3$ Addn. Time, min. | Percent Olefin Conversion | Percent Sulfonate Yield | |
|---|---|---|---|---|---|---|---|---|---|
| | | | | | | | | Before Hydrolysis | After Hydrolysis |
| 1 | $\alpha$-$C_{16}$ | 1.09 | Air | 14 | 27–30 | 35 | 86 | 30 | 85 |
| 2 | Int. $C_{16}$[1] | 0.95 | Air | 14 | 27–30 | 45 | 84 | 29 | 84 |
| 3 | $\alpha$-$C_{14}$ | 0.90 | $SO_2$ | 8–9 | 25–27 | 45 | 89 | 32 | 89 |
| 4 | Int. $C_{14}$[1] | 0.85 | Air | 14 | 25–27 | 60 | 86 | 28 | 85 |
| 5 | Int. $C_{15}$[2] | 1.07 | Air | 7 | 26–29 | 80 | 83 | 20 | 70 |
| 6 | $\alpha$-$C_{14}$–$C_{18}$[3] | 0.8 | $N_2$ | 14 | 25–30 | 50 | 80 | 26 | 75 |

[1] Prepared by Ni-aluminum alkyl isomerization of the indicated alpha-olefin-nil $\alpha$-olefin content.
[2] Prepared by dehydrochlorination of an isomeric mixture of nomochloropentadecane (less than about 5 percent 1-isomer).
[3] Fraction derived from a growth product and composed of 49 percent $C_{14}$, 33 percent $C_{16}$ and 18 percent $C_{18}$.

potassium tripolyphosphate and tetrapotassium pyrophosphate. In addition to the anionic component and the polyphosphate sequestering agent, various other components can and generally are included in the formulation. For example, a small amount of a metal corrosion inhibitor, e.g., sodium silicate, is generally employed. Likewise, a hydrotrope or material capable of further enhancing the solubility characteristics of the active and/or polyphosphate component is generally utilized. The lower alkylbenzene mono-sulfonates are typical examples of suitable hydrotropes. Additionally, prevalent use of small amount of an anti-soil redeposition agent such as carboxymethylcellulose is observed.

Still other adjuvants that can be incorporated in compositions of this type include foam boosters, optical improvers, perfumes, dyes and the like. Among the foam boosters or stabilizers generally employed are such as the

Example II

The purpose of this example is two-fold, namely, to compare the use of liquid sulfur trioxide with that of diluted vaporous sulfur trioxide to effect the sulfonation of an olefin and additionally to illustrate the manner of recovering alkyl gamma-sultones from the sulfonation reaction mixture obtained by the process of this invention.

A standard run conducted in accordance with the general procedure described in Example I is identified as No. 7 in Table II set forth hereinbelow. Other pertinent operating conditions observed in this run are indicated in said table. In Run No. 8 the olefin charge was sulfonated by employing as the sulfonating agent a liquefied mixture of one part by weight sulfur trioxide and 1.4 parts by weight sulfur dioxide. The liquid sulfonating agent was added slowly to the olefin charge with stirring. Further conditions of the reaction are set forth in Table II.

The respective olefin conversions realized for Runs 7 and 8 indicate that the liquid SO₃/SO₂ system for sulfonating olefins is not suitably adapted for operations of this nature conducted under atmospheric pressure conditions whereas such conditions advantageously represent the optimum for the process of this invention.

TABLE II

| Run No. | Olefin Charged | SO₃ Conc., gm. SO₃/ml. SO₂ | Mol Ratio, SO₃:Olefin | Reaction Temperature, °C. | Olefin Conversion, Percent |
|---|---|---|---|---|---|
| 7 | α-C₁₆ | | 0.99 | 25–3 | 90 |
| 8 | α-C₁₆ | 0.4 | 1.06 | 255 | 50 |

About 50 parts of the crude sulfonation product from Run No. 7 were neutralized with 10 percent sodium hydroxide dissolved in isopropanol. The neutralized mixture was then extracted several times with 30° to 60° petroleum ether. The resultant extracts were combined and concentrated by evaporating the solvent on a steam bath. The solids obtained were redissolved in hexane and then fractionally crystallized therefrom. Nuclear magnetic resonance (N.M.R.) analysis for the crystallized material (M.P. 69°–70° C.) indicated the following structural configuration:

—gamma sultone with sulfur on a terminal carbon

Example III

The purpose of this example is to illustrate the chemical nature of a composition obtained in accordance with the sulfonation procedure taught herein as compared with the composition obtained by employing a conventional type sulfur trioxide complex as the sulfonating agent.

Run 9 set forth in Table III hereinbelow was conducted employing the same general procedure utilized for the various runs described in Example I. In Run No. 10 of this example the sulfonating agent consisted of an equimolar complex of sulfur trioxide and dioxane. A sufficient quantity of carbon tetrachloride was employed in this run in order to assure a homogeneous reaction system. Other pertinent data relative to both of these runs are given in the table.

TABLE III

| Run No. | Olefin | Mol Ratio, SO₃:Olefin | Sulfonation Temperature, °C | Percent Olefin Conversion |
|---|---|---|---|---|
| 9 | α-C₁₄ | 0.90 | 25–27 | 89 |
| 10 | α-C₁₄ | 2.00 | 70 | 70 |

The sulfonation reaction products of Runs No. 9 and No. 10 were each found to contain about 35 percent unsaturated sulfonic acid and 65 percent sultone. These respective sulfonation products were then subjected to basic hydrolysis and neutralized. The neutralized products were dried and analyzed. The neutralized product derived from Run No. 9 was found to be composed of a mixture of alkene and gamma-hydroxy alkyl sulfonates, whereas that derived from Run No. 10 consisted of a mixture of alkene and betahydroxy alkyl sulfonates.

Example IV

This example illustrates the unique usefulness of the surface active compositions of this invention in preparing liquid heavy-duty detergent concentrates. Several formulations involving variations in amounts of active present and ratios of polyphosphate to active were observed in this series. Additionally included in this series was a formulation containing sodium dodecylbenzene sulfonate as the active. The active component employed in this series corresponding to the surface active composition of this invention was the sodium salt of the product obtained by hydrolyzing the sulfonation run identified as No. 6 in Table I, Example I. The cloud points of the formulations tested in this series are given in the following Table IV. The composition of the concentrate is also indicated in said table in which the abbreviation TKPP signifies tetra potassiumpyrophosphate and the abbreviation SXS signifies sodium xylene monosulfonate.

TABLE IV

| Sample No. | Formulation, Percent | | | | Cloud Point (° F.) |
|---|---|---|---|---|---|
| | Active | TKPP | SXS | H₂O | |
| 1 | 10% Na DBS | 20 | 7.5 | 62.5 | 89 |
| 2 | 10% Na (Run 6 Table I sulf.) | 20 | 7.5 | 62.5 | 36 |
| 3 | 20% Na (Run 6 Table I sulf.) | 20 | 7.5 | 52.5 | 54 |
| 4 | 10% Na (Run 6 Table I sulf.) | 30 | 7.5 | 52.5 | 58 |

Samples No. 2–4 and a variation of Sample No. 1 (increased active content) were tested for foam stability and detergency properties. The foam stability property was evaluated employing a conventional dishwashing test which was carried out at 115° F., 0.125% concentration and at 50 p.p.m. hardness. The reported detergency ratings represent the difference between the reflectance measurement of washed and unwashed standard soiled cloths. The washing operation in the detergency test was conducted in the Terg-O-Tometer at 120° F., 0.2% concentration and at 50 and 300 p.p.m. levels of hardness. The results obtained are given in the following Table V:

TABLE V

| Sample No. | Foam Stability (Plates Washed) | Detergency Rating | |
|---|---|---|---|
| | | 50 p.p.m. | 300 p.p.m. |
| 1A* | 4 | 3.4 | 0.1 |
| 2 | 18 | 3.5 | 0.6 |
| 3 | 23 | 4.5 | 2.7 |
| 4 | | 4.0 | 2.6 |

*Essentially corresponding to the formulation of Sample 3 except that Na DBS is active.

The unusual effectiveness of the surface active compositions of this invention is graphically shown in the preceding detergency test results in hard water. These data show that the composition of this invention is decidedly superior to dodecylbenzene sulfonate when these respective actives are employed in same concentration in an otherwise similar heavy-duty detergent composition.

Example V

In this example, both the sodium salt of the hydrolysis product of sulfonation Run No. 1 and that of Run No. 6 of Example I were compounded into a light-duty formulation. The formulation contained 18 percent sulfonate, 12 percent of a sodium salt of nonyl phenol ether sulfate (40 percent E. O.), 5 percent of lauric diethanolamide and 8 percent sodium xylene sulfonate. A similar light-duty concentrate was prepared based on sodium dodecylbenzene sulfonate as the active component. The various formulations were tested for foam stability and detergency in substantially the same manner as described in Example IV. These tests showed the light-duty formulations containing the surface active composition of the invention as the active component to be slightly better in foam stability characteristics than the formulation based on the DBS in soft water and approximately equivalent in hard water. All of the test samples containing the sulfonates of this invention as active exhibited significantly lower cloud points than the test samples containing DBS as the active.

What is claimed is:

1. An improved method for preparing a surface active composition comprising the steps:
   (a) contacting an essentially linear C₁₂–C₂₀ monoolefin maintained at a temperature not greater than about 50° C. with a gaseous mixture of from about 0.1 to 10 parts by volume sulfur trioxide and correspondingly from about 99.9 to 90 parts by volume of an inert carrier gas until not in excess of about 1 mol of sulfur trioxide per mol of said olefin is reacted;
(b) hydrolyzing the reaction product of step (a);
(c) neutralizing said hydrolyzed reaction product with a water-soluble base, and thereupon;
(d) recovering as the surface active composition the sulfonate content of said neutralized mixture.

2. An improved method for preparing a surface active composition comprising the steps:
(a) continuously introducing at a substantially uniform rate a gaseous mixture of from about 1 to 4 parts by volume sulfur trioxide and correspondingly from about 99 to 96 parts by volume of an inert carrier gas into a straight-chain, $C_{12}$–$C_{20}$ mono-olefin charge maintained at a temperature between about 20° and 35° C. to the extent whereby from about 0.8 to 1.1 mol of sulfur trioxide per mol of alpha-olefin present is so introduced;
(b) hydrolyzing the reaction product of step (a);
(c) neutralizing said hydrolyzed reaction product with a water-soluble base, and thereupon;
(d) recovering as the surface active composition the sulfonate content of said neutralized mixture.

3. A process in accordance with claim 2 wherein said hydrolysis is effected at a temperature between about 80° and 140° C. and at a pH from about 7 to 9.

4. The improved surface active composition consisting essentially of a water-soluble salt of a mixture of gamma hydroxy alkyl and alkene sulfonic acids obtained by hydrolyzing a reaction product of from about 0.8 to 1.1 mol of gaseous sulfur trioxide with one mol of a straight-chain mono-olefin having from about 12–20 carbon atoms.

5. The composition in accordance with claim 4 wherein said olefin is an alpha-olefin.

6. The composition in accordance with claim 5 wherein the alpha-olefin is a mixture of even-numbered carbon atom olefins having an average molecular weight corresponding to about that of hexadecene and additionally containing a substantial amount of hexadecene.

7. The improved surface-active composition obtained by hydrolyzing a reaction product of from about 0.8 to 1.1 mol of gaseous sulfur trioxide with one mol of an unsymmetrical dialkyl ethylene having from 12 to 20 carbon atoms.

References Cited
UNITED STATES PATENTS

| | | | |
|---|---|---|---|
| 2,265,993 | 12/1941 | Beckham | 260—513 |
| 2,600,415 | 6/1952 | Mikeska | 260—513 |
| 2,979,466 | 4/1961 | Silberman | 252—138 |
| 2,990,375 | 6/1961 | Steinhauer et al. | 252—138 |
| 3,115,501 | 12/1963 | Finch et al. | 260—327 |
| 3,117,133 | 1/1964 | Kothe et al. | 260—327 |
| 2,793,229 | 5/1957 | Blaser et al. | 260—327 |
| 3,164,608 | 1/1965 | Blaser | 260—327 |
| 3,164,609 | 1/1965 | Vos et al. | 260—327 |

J. A. PATTEN, *Primary Examiner.*

UNITED STATES PATENT OFFICE
CERTIFICATE OF CORRECTION

Patent No. 3,409,637                                        November 5, 1968

Raymond D. Eccles et al.

It is certified that error appears in the above identified patent and that said Letters Patent are hereby corrected as shown below:

Columns 5 and 6, TABLE I, footnote 2, "nomochloropentadecane" should read -- monochloropentadecane --; same table, footnote 3, "pe cent" should read -- percent --. Column 7, TABLE II, fifth column, line 1 thereof, "25-3" should read -- 25-35 --; same table, fifth column, line 2 thereof, "255" should read -- 25 --; same table, first column, line 1 thereof, insert -- 8 --. Column 8, TABLE IV, fourth column, lines 1 to 4 thereof, "7,5", each occurrence, should read -- 7.5 --.

Signed and sealed this 17th day of March 1970.

(SEAL)
Attest:

Edward M. Fletcher, Jr.                             WILLIAM E. SCHUYLER, JR.
Attesting Officer                                             Commissioner of Patents